(12) United States Patent
Dolan et al.

(10) Patent No.: US 9,037,548 B1
(45) Date of Patent: May 19, 2015

(54) DYNAMICALLY UPDATED DATA MANAGEMENT PROCESSING PLANS GENERATED OUTSIDE A STORAGE ARRAY

(75) Inventors: Sean Christopher Dolan, Belmont, MA (US); Marik Marshak, Newton, MA (US); Alexandr Veprinsky, Brookline, MA (US); Owen Martin, Hopedale, MA (US); Xiaomei Liu, Natick, MA (US); Hui Wang, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 147 days.

(21) Appl. No.: 13/173,056

(22) Filed: Jun. 30, 2011

(51) Int. Cl.
*G06F 7/00* (2006.01)
*G06F 3/06* (2006.01)
*G06F 9/455* (2006.01)

(52) U.S. Cl.
CPC .......... *G06F 3/0689* (2013.01); *G06F 9/45558* (2013.01)

(58) Field of Classification Search
CPC .......... G06F 3/0689; G06F 2211/1095; G06F 12/125
USPC ............................ 707/688, 700, 801, 999.107
See application file for complete search history.

(56) References Cited

U.S. PATENT DOCUMENTS

| | | | | |
|---|---|---|---|---|
| 6,081,665 | A * | 6/2000 | Nilsen et al. | 717/116 |
| 6,237,141 | B1 * | 5/2001 | Holzle et al. | 717/153 |
| 2001/0052117 | A1 * | 12/2001 | Holzle et al. | 717/5 |
| 2003/0212872 | A1 * | 11/2003 | Patterson et al. | 711/165 |
| 2006/0123397 | A1 * | 6/2006 | McGuire | 717/127 |
| 2008/0270720 | A1 * | 10/2008 | Tanabe et al. | 711/162 |
| 2009/0292871 | A1 * | 11/2009 | Watanabe et al. | 711/114 |
| 2011/0138148 | A1 * | 6/2011 | Friedman et al. | 711/173 |
| 2011/0197046 | A1 * | 8/2011 | Chiu et al. | 711/171 |
| 2012/0066337 | A1 * | 3/2012 | Wu et al. | 709/214 |
| 2012/0102455 | A1 * | 4/2012 | Ambat et al. | 717/115 |

* cited by examiner

*Primary Examiner* — Mohammed R Uddin
(74) *Attorney, Agent, or Firm* — Anderson Gorecki & Rouille LLP (57) ABSTRACT

A networked data storage system includes data movement logic and a virtual machine for executing a data management processing plan which is generated by a facility outside the storage array based on statistical information associated with extent level activity metrics provided by the storage array. Dynamically updated and automatically generated data management processing plans are provided to the storage array in the form of units of compiled byte code which the storage array is able to verify and execute using a virtual machine. The virtual machine interfaces with the environment in which it is embedded in a carefully constrained manner, thereby preventing clearly undesirable operations.

36 Claims, 7 Drawing Sheets

```
if ( time_since_program_load < 1000000 )
{
    if ( ( device_id > 128 ) && ( device_id < 200 ) )
    {
        if ( ( ( 4 * ext.prev_short_rrm ) + ( 2 * ext.prev_short_sr ) +
            ext.prev_short_w ) > 100 )
        {
            move_extent( 2 );
        }
        else if ( ( ( 3 * ext.long_rrm ) + ext.long_sr + ext.long_w ) < 50 )
        {
            move_extent( 4 );
        }
    }
    else
    {
        .... Instructions for other devices ....
    }
}
else
{
    .... Instructions for later time...
}
```

DYNAMICALLY UPDATED DATA MANAGEMENT PROCESSING PLANS GENERATED OUTSIDE A STORAGE ARRAY

CROSS-REFERENCE TO RELATED APPLICATIONS

N/A

FIELD OF THE INVENTION

This invention is generally related to data storage, and more particularly to data management processing plans.

BACKGROUND OF THE INVENTION

Networked data storage is commonly used in enterprise environments to make data available to multiple users and automatically maintain copies of data on different storage devices which may be in different geographical locations in order to reduce the likelihood of data loss. Generally, data IO requests are sent from a user computer or network device to a primary storage array (R1) via a network. In order to mirror the production data stored by the primary storage array it is configured in a partner relationship with a remote secondary storage array (R2).

An individual storage array may be associated with multiple tiers of data storage resources having different performance characteristics, e.g., storage capacity and read/write speed. The cost per bit of stored data can vary widely for different storage resources. For example, a high-speed flash array is more costly per bit of storage than an array of disk drives, which in turn is more expensive than an array of optical disks. Performance of the overall storage array is at least in part a function of how effectively the different storage resources are utilized.

The storage array may also move data into and out of cache memory to enhance performance. Storage system cache is implemented as high speed memory, the cost of which is much greater than the cost per GB of storage in a persistent tier. A read request for data that is in the storage system cache can be satisfied by the storage system more efficiently and with a lower response time than if the storage system had to access the data in persistent storage. Consequently, deciding which data to place in cache effects performance of tiered or non-tiered storage.

Hierarchical storage management systems automatically move data between different storage tiers in order to effectively utilize the different storage resources. Most of the enterprise's data is typically stored on relatively slower storage devices. Data is moved from the slower storage devices to faster storage devices based on activity. For example, data files which are frequently accessed are stored on relatively faster devices, but may be moved to relatively slower devices if the files are not accessed for a predetermined period of time. When the file is accessed again it may be moved back to relatively faster storage. By moving files based on activity and utilizing less costly, slower storage devices for the relatively rarely accessed files the storage array achieves performance which may approach that of using a greater amount of more costly storage resources at a lower cost. Data management processing plans are not limited to movement of data between tiers in tiered storage. Data storage systems are required to make decisions associated with movement of data across storage system boundaries to balance the workload on a set of storage systems, to maintain network proximity to key users of the data, and for other reasons. The logic for implementing these decisions is typically performed by software or firmware on enterprise equipment. Consequently, modifying the data management processing plan logic generally involves significant effort and can create problems if not carefully executed.

SUMMARY OF THE INVENTION

In accordance with an embodiment of the present invention, a computer program stored on non-transitory computer-readable memory and used to implement a method comprises: an interface for exporting statistical information related to data storage including extent level metrics; an analysis function operating in response to the statistical information to generate a data management processing plan; a compiler which translates the data management processing plan into byte code; and a virtual machine upon which the byte code executes to provide data movement logic which causes data to be moved or copied from a first storage resource to a second storage resource.

In accordance with another embodiment of the present invention, an apparatus comprises: a storage array having data movement logic including a virtual machine and an interface for exporting statistical information related to data storage including extent level metrics; and a device separate from the storage array including an analysis function and a compiler, the analysis function operating in response to the statistical information from the storage array to generate a data management processing plan which is translated to byte code by the compiler; wherein the byte code is sent to the storage array by the device, and wherein the byte code executes on the virtual machine.

In accordance with an embodiment of the present invention, a method comprises: exporting, from a storage array, statistical information related to data storage including extent level metrics; generating a data management processing plan outside the storage array in response to the statistical information; translating the data management processing plan into byte code; and executing the byte code on a virtual machine of the storage controller to cause data to be moved from a first storage resource to a second storage resource.

Aspects of the invention provide advantages over the prior art. For example, relatively complex storage resource optimization planning computations can be performed outside the storage system because extent level metrics are exported to an external analysis facility. Furthermore, the external analysis facility can produce as output a storage management processing plan that specifies the rules to use to determine data movement operations, cache pre-fetch operations, or other operations related to optimized storage resource usage (all of which may reference the values of the extent level metric values at the time the rules are evaluated). Previous data management plans were limited to being either explicit data management directives or inputs into a static set of data management processing plans. Consequently, aspects of the present invention allow a wider range of data management processing plans to be supported without requiring software updates to the storage system.

Another advantage of aspects of the invention is enhanced prediction of future data access activity. Previous systems predict activity levels based on recent past use. An application executing on a host that is a source for IO operations to a storage system, or that has knowledge of the execution patterns of such sources of IO operations, may be able to better predict the nature of future IO operations that will be delivered to the storage system. Such applications may leverage such knowledge, together with knowledge of the manner in which extent level metrics are managed within the storage system, to dynamically generate a data management processing plan based on an improved prediction of future storage use.

These and other advantages of the invention will be more apparent from the detailed description and the drawing.

DETAILED DESCRIPTION

Various aspects of the invention may be implemented partially or completely using computer program code. The computer program code is stored on non-transitory computer-readable media and utilized by processing hardware. Computer-readable media may include different forms of volatile (e.g., RAM) and non-volatile (e.g., ROM, flash memory, magnetic or optical disks, or tape) storage which may be removable or non-removable. The program code may be provided as a computer program product or be integrated into network equipment.

Figure 1:
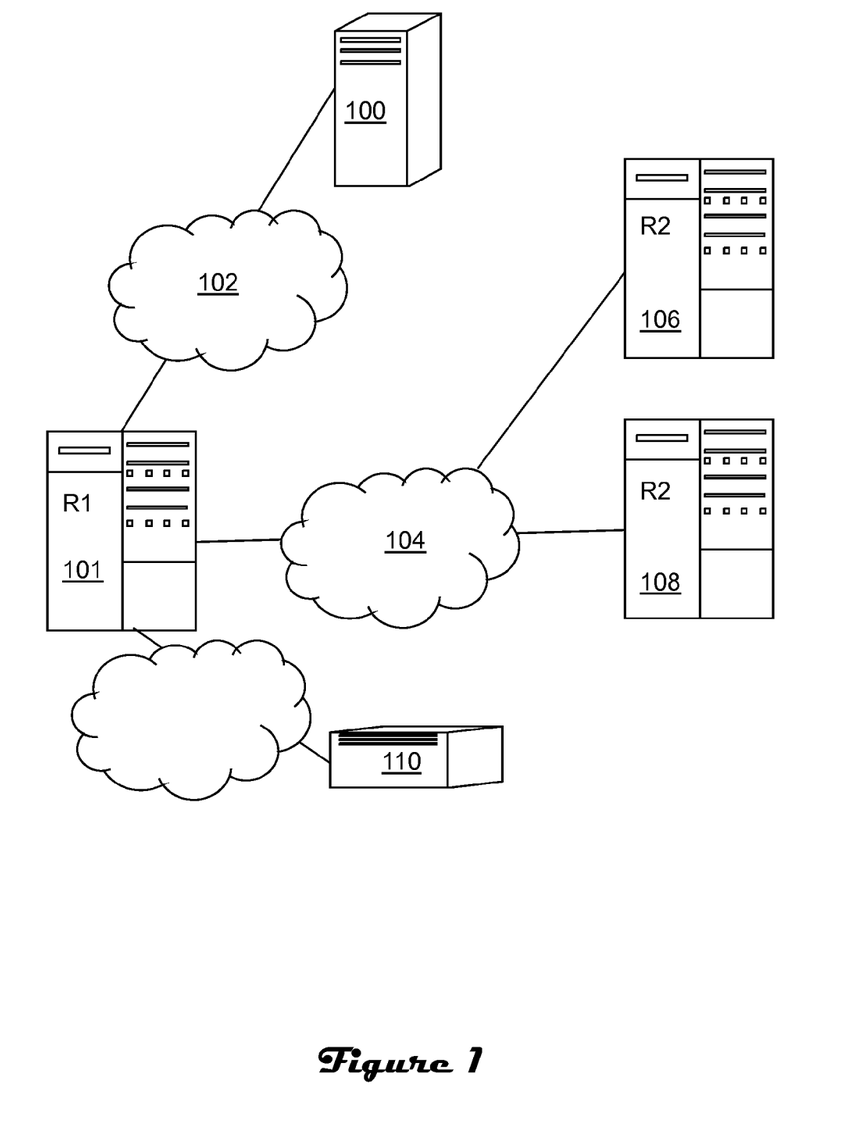
FIG. 1 illustrates a simplified networked storage system in which aspects of the invention are implemented.

FIG. 1 illustrates a simplified networked storage system in which aspects of the invention are implemented. At least one enterprise device 100 such as a user computer or server is in communication with a primary storage system (R1) 101 via a network 102. Production data is stored on the primary storage system. In order to mirror production data to a secondary (target) site, the primary storage system 101 is configured in a partner relationship with at least one remote storage system (R2). In the illustrated example the primary storage system 101 is in a partner relationship with both secondary storage system 106 and secondary storage system 108 via network 104. Those skilled in the art will appreciate that various other configurations are possible. Movement of data between the primary and secondary storage systems is accomplished with exchanges known as IOs. For example, Read and Write operations are types of IOs. Typically, multiple communication links are used between R1 and R2, but single logical links are shown in the simplified drawing.

Figure 2:
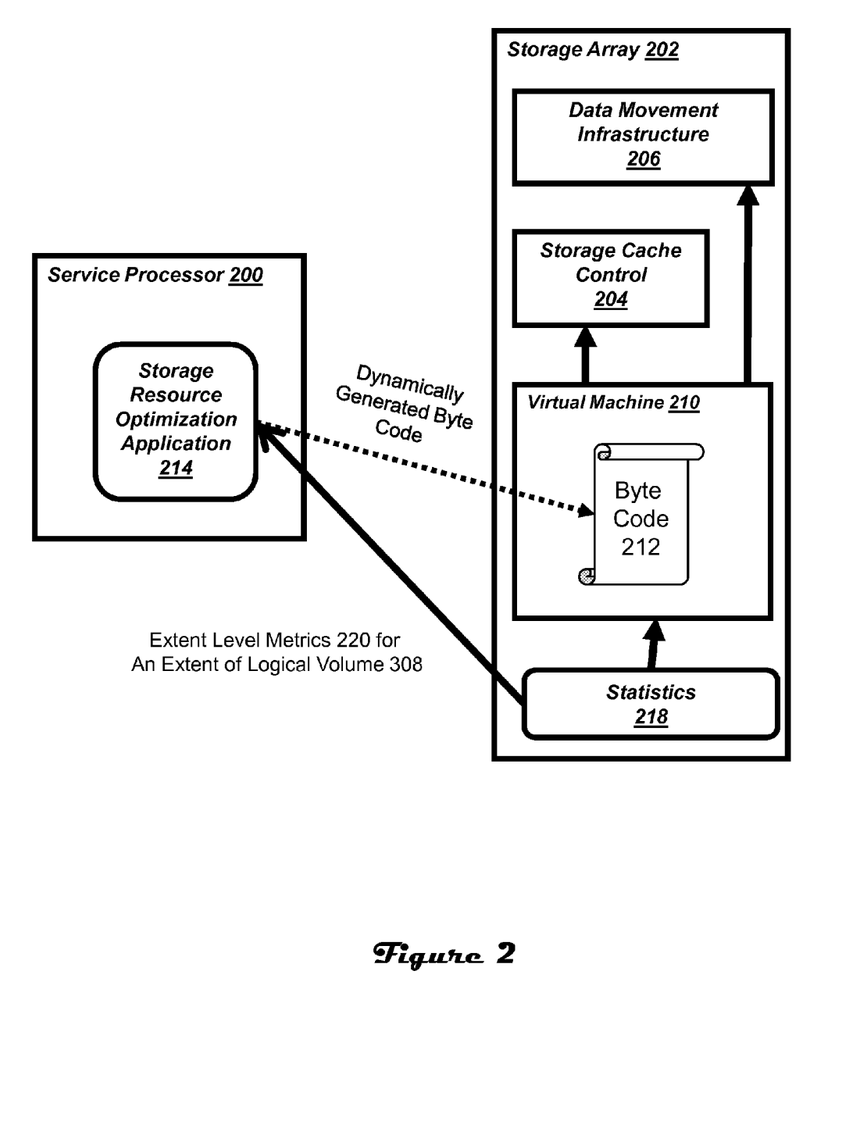
FIG. 2 illustrates an embodiment of an embedded virtual machine and byte code generation.
Figure 3:
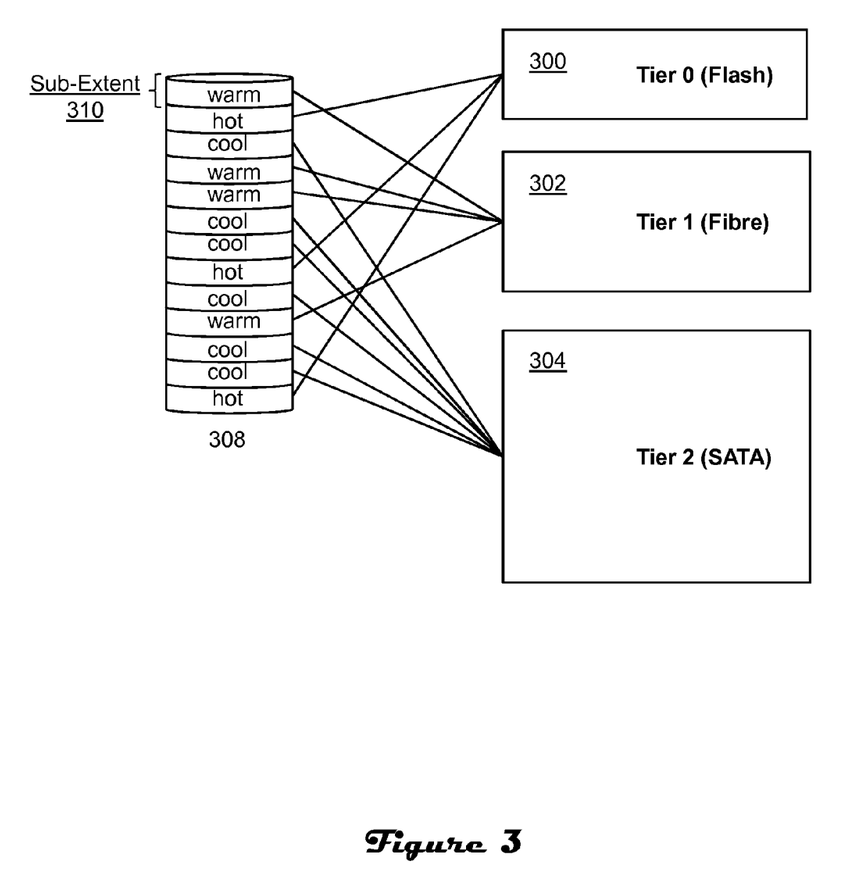
FIG. 3 illustrates tiered storage.
Figure 4:
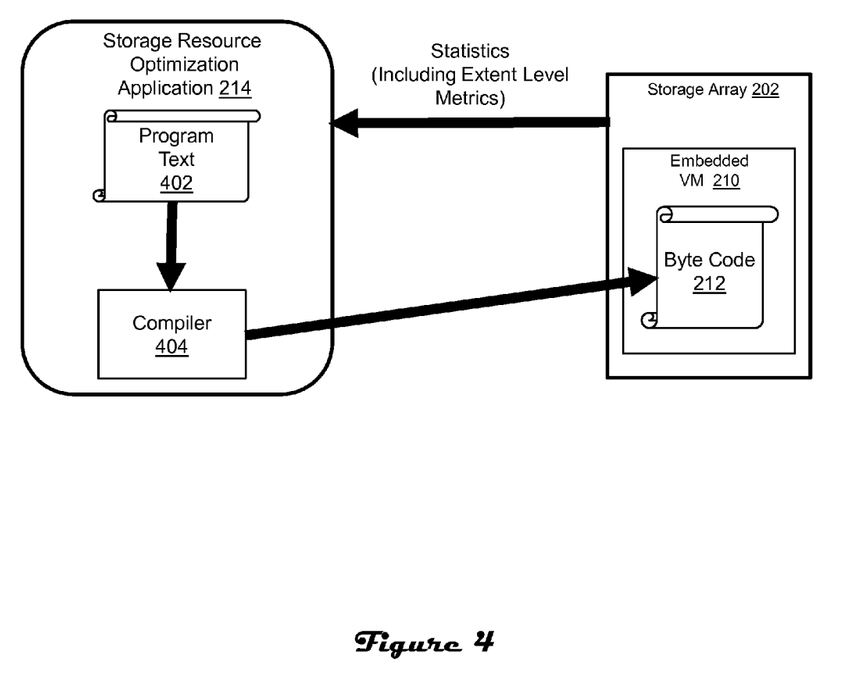
FIG. 4 illustrates an alternative embodiment of an embedded virtual machine and byte code generation.

Referring to FIGS. 1 through 3, the primary storage system 101 includes a service processor 200 and a storage array 202. The service processor monitors operation of the storage array and provides notification and support functions. The storage array includes storage cache control 204, data movement infrastructure 206, a virtual machine 210, and at least one logical volume 308 (FIG. 3). The logical volume includes multiple tiers 300, 302, 304 of data storage resources. The virtual machine 210 utilizes a storage array interface 700 (FIG. 7) to communicate with the data movement infrastructure 206, storage cache control 204, and statistics repository 218. Generally, the storage cache control and data movement infrastructure are responsive to the virtual machine to move the data, e.g. between different tiers within the logical volume and into storage system cache. Storage in the logical volume 308 may be allocated in chunks or data portions of a particular size. For example, and without limitation, a chunk may correspond to a group of 12 tracks (e.g., 12 tracks*64 Kbytes/track=768 Kbytes/chunk).

As shown in FIG. 3, data at the extent or sub-extent level is stored in a tier which is selected on grounds such as relative ranking based on expected activity level (e.g., cool, warm, hot) of the data. Groupings of "N" chunks are referred to as an extent, where N represents an integer number of chunks, N>0. For example, in one embodiment, an extent may be 480 chunks (N=480) having a size of 360 MBs (megabytes). Smaller regions of an extent are referred to as sub-extents. The illustrated logical volume includes a high-speed flash array at tier 0 (300), a Fibre Channel array at tier 1 (302), and a SATA array at tier 2 (304). Tier 0 is used to store extents or sub-extents which are expected to be the most frequently used (hot). In particular, the highest ranked extents or sub-extents of storage in terms of expected use up to the capacity of tier 0 are selected for storage at tier 0. Extents or sub-extents of storage which are expected to be less frequently used than hot extents or sub-extents (warm) are stored at tier 1. In particular, the next highest group ranked extents or sub-extents in terms of expected use up to the capacity of tier 1 are selected for storage at tier 1. The remaining extents or sub-extents are stored at tier 2. Expected activity level tends to change over time so data is moved between slower storage devices and faster storage devices based on updates to expected activity. For example, extents or sub-extents which are expected to be frequently accessed are stored on relatively faster devices, but may be moved to relatively slower devices when the extents or sub-extents are not expected to be accessed for a predetermined period of time. However, unlike previous systems the expected level of activity need not be limited to a static interpretation of past activity.

Referring again to FIG. 2, the virtual machine 210 implements dynamically generated storage optimization program byte code 212 produced by a storage resource optimization application 214 operating on the service processor 200. The application 214 generates the byte code 212 based on statistical information 218. The statistical information 218 is related to data storage, and includes extent level activity metrics 220 which are collected by the storage array 202 and provided to the application 214. The extent level metrics provide information about the average rate that read miss, pre-fetch and write operations have been performed for a given extent of storage. These rates are provided with respect to a short and a long time period. The extent level metrics may include information which allows the share of overall access rate for the extent to be attributed to sub-extents 310. The storage resource optimization application 214 can use the extent level metrics to determine the optimal use of storage. The storage optimization program supplied by the storage resource optimization application may reference the extent level metrics (including information at the sub-extent level), and use the values of the metrics to determine the proper tier for each extent (or sub-extent).

Referring to FIGS. 1 through 4, collection and use of the statistics 218 facilitates analysis of storage activity by the storage resource optimization application 214 and also generation and implementation of an updated data management processing plan that changes how data is associated with the storage tiers. In accordance with the current state of the art the storage array does not typically include the resources required to analyze data activity to calculate modifications to a data management processing plan. Furthermore, it may be impractical to export detailed mappings of the logical volume in order to facilitate calculation of modifications to a data management processing plan by an external device. Aspects of the invention help to overcome these problems by exporting extent level metrics from the storage array, and using those extent level metrics outside the storage array to analyze data storage activity and dynamically generate data movement byte code which modifies the data management processing plan. More particularly, the storage resource optimization application 214 functions in response to the statistics 218 including extent level metrics 220 to create storage optimization program text 402 that describes data management operations that will allow the storage system to improve performance aspects of quality of service. The storage optimization program text 402 is provided to a storage optimization programming language compiler 404 which generates corresponding byte code 212 which is sent to the virtual machine 210. The storage array 202 is able to verify and execute the byte code using the embedded virtual machine.

The procedure of exporting performance metrics and generating updated storage optimization program byte code can be performed continuously, periodically or in response to a trigger condition in order to dynamically update the data management plan in response to changing conditions. Consequently, the virtual machine 210 can execute a class of data management processing plans related to adjusting certain aspects of the quality of service provided by the storage system, including but not limited to performance aspects of quality of service such as response time and I/O operation throughput. Moreover, the virtual machine and dynamically generated storage optimization program byte code allow new data movement logic to be moved into the array and implemented without a major software or hardware upgrade. Prior art static data movement logic with dynamically set parameters enables the storage array to leverage calculations performed by an external analysis application provided that the external analysis application is aware of and properly accounts for the static logic that the array will apply. For example, the external analysis application can adjust variables such as activity thresholds associated with different tiers of storage. However, the static logic cannot be changed without a major software or hardware upgrade. One key difference with dynamic data movement logic is that storage array software does not need to be changed to accommodate a new storage optimization plan. This enables the storage array to integrate more rapidly with a new external analysis application.

It should be noted that the storage resource application 214 may be operated outside the service processor, either elsewhere within the storage system or outside the storage system. For example, the tier storage resource optimization application can execute outside the service processor but within the primary storage system, or on a device 110 (FIG. 1) outside the primary storage system. Further, a remotely operated storage resource optimization application can support multiple storage systems and logical volumes. In other words, each one of a plurality of storage systems may provide its statistics to the storage resource optimization application and the storage resource optimization application may return customized byte code to each of those storage systems based on the statistics.

Figure 5:
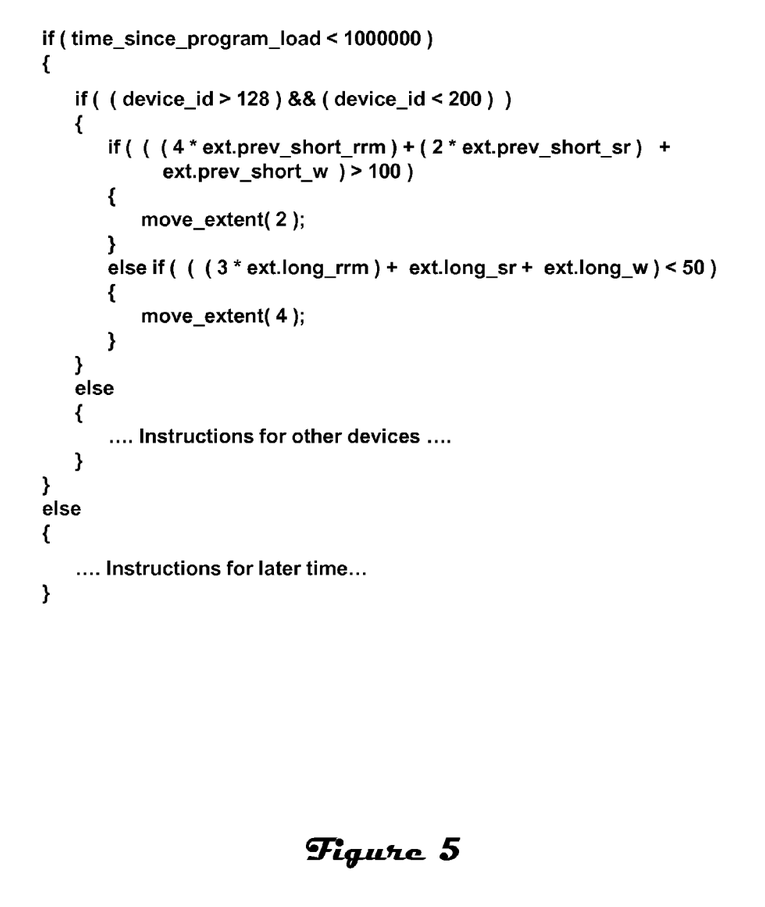
FIG. 5 illustrates an example of a storage optimization program.

An example of a storage optimization program is shown in FIG. 5. The example program functions to move data within the storage array. The language may be characterized by C-like syntax and built-in mechanisms for referencing metrics and services within the storage controller specifically related to the optimization of tiered storage resource usage. A typical storage optimization program includes a list of statements such as runtime calls, assignment statements and conditional statements. Conditional statements use Boolean expressions involving Boolean operators and arithmetic comparisons. The storage optimization programming language includes support for arithmetic expressions and built-in names for runtime variables and runtime calls. The runtime calls supported by the language include methods for adjusting storage resource usage. Runtime calls are also provided for altering the values of a set of variables (an instance of which that the storage array saves along with each instance of the extent level metrics) that are reserved specifically for preserving results calculated during one execution of a data management processing plan so that the value in the variables may be referenced, and perhaps modified, during a subsequent execution of the same or different processing plan.

Figure 6:
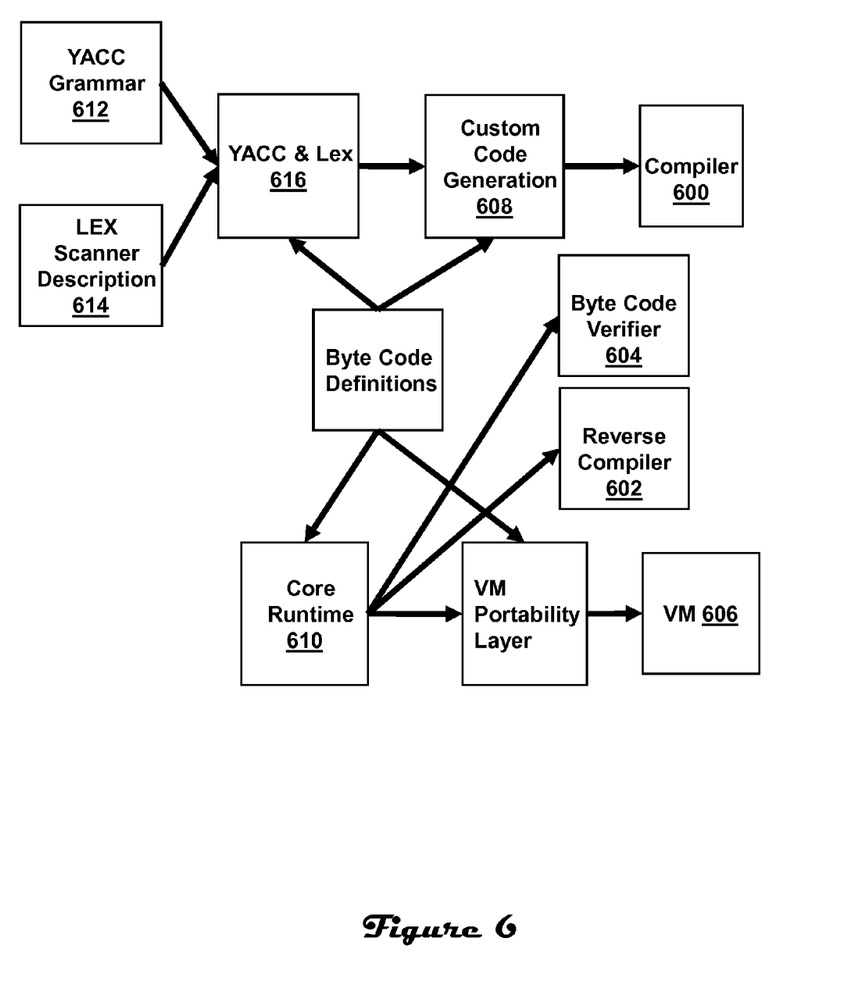
FIG. 6 illustrates functions associated with updating the data management processing plan.

FIG. 6 illustrates functions associated with updating the data management processing plan. Various support functions provide a foundation for the primary functions compiling program text 600, reverse compiling program text 602, verifying byte code 604, and the virtual machine 606. The compiler function 600 generates storage optimization program byte code from corresponding plain text provided by a custom code generation function 608. The byte code is outputted as a text string. If the syntax of the inputted program is not correct, the line number at which the first syntax error was encountered is indicated. The reverse compiler 602 generates storage optimization program text from storage optimization program byte code. In particular, it produces a sensibly indented human readable version of the program suitable for subsequent recompilation. The byte code verifier tests the storage optimization program byte code for errors at load time. The core runtime function 610, which is most of the virtual machine code, is tested outside the storage array. Yacc 612 and Lex 614 based implementation 616 simplifies the matter of imposing constraints on the programs that are allowed to be generated.

Generally, there are two methods to verify the byte code: structural verification and read-only verification. Structural verification verifies the entire storage optimization program. The array should perform this verification before accepting a new storage optimization program. An error reported if the program is not well-formed, a reference exists to an unrecognized runtime call, a reference exists to an unrecognized runtime variable, an instance is found of dividing by a value that is guaranteed to be zero, or an index reference is found that is guaranteed to be out of range. Read-only Verification verifies the code path that would be taken using current runtime variable values (with no updates or runtime calls permitted during verification).

Figure 7:
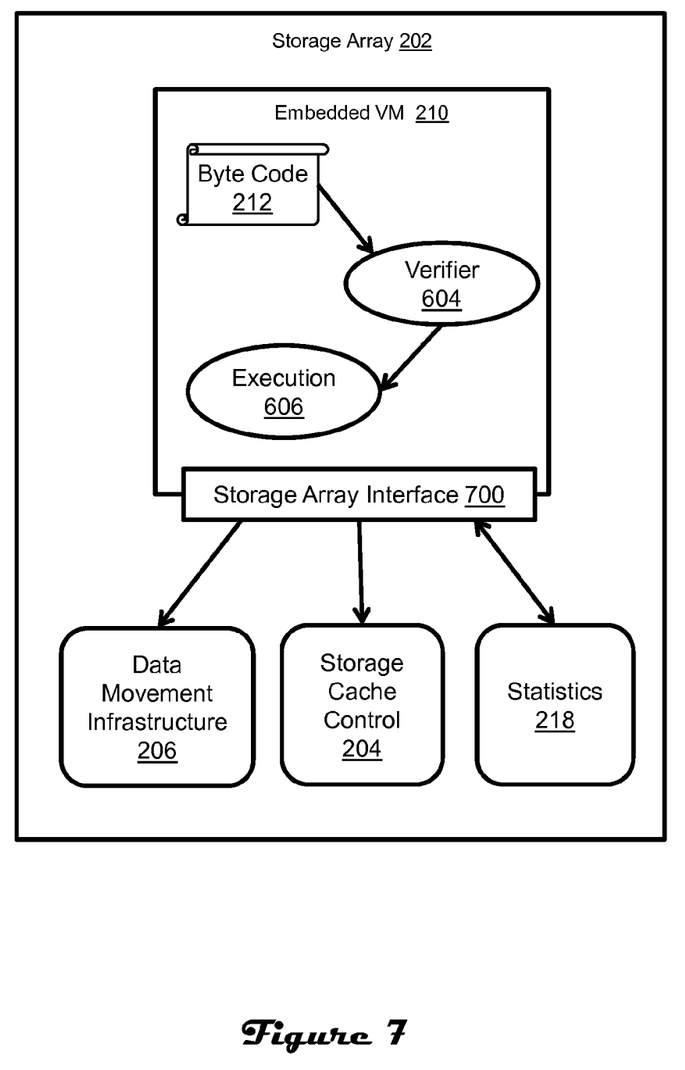
FIG. 7 illustrates the "sandbox" environment in which the byte code operates.

Referring to FIG. 7, the virtual machine 210 interfaces with the environment in which it is embedded in a carefully constrained manner, thereby facilitating safe execution of the byte code 212 relative to the array. In other words, the byte code operates in a protective "sandbox" environment that reduces or eliminates the possibility of implementation of clearly undesirable operations upon the array. The byte code is permitted to access a limited set of variables from the array environment including: device and extent level metrics, device ID, elapsed time since program load, extent ID, and current pool or current tier. Access to the device ID facilitates treating sub-sets of devices differently. Elapsed time since program load can be used to pre-program changes in behavior that will take place even if the storage resource application responsible for update the plan is not available. Access to the extent ID is useful for testing purposes.

During the course of executing a storage optimization program 212, but before executing a given instruction, the execution unit 606 checks the instruction to see if it is attempting to perform an operation with an undefined result, such as zero divide and reference to non-existent metrics. Such instructions are not executed—error handling code is invoked instead. This reduces the risk involved in accepting specific storage optimization programs that the storage array was not necessarily formally tested with. Verifications are also performed by verifier 604 at the time that a storage optimization program is received, before initiating an execution of the program. Where possible, errors are detected during this initial load verification phase. The initial load verification phase detects invalid byte codes and corrupted byte code. The initial load verification phase can also detect operations that would be guaranteed to have undefined results when executed.

Data management processing plans are not limited to movement of data between tiers in tiered storage. Data storage systems are required to make decisions associated with movement of data across storage system boundaries to balance the workload on a set of storage systems, to maintain network proximity to key users of the data, and for other reasons. It should be recognized that aspects of the invention described above could be used to generate and implement updated data management processing plans for any of these and other requirements. Aspects of the invention can also be used to optimize the use of the storage system cache, for storage systems that possess a cache. Storage system cache is not a tier in the usual sense, since the data in the cache is not the persistent copy of the data; it is a copy of data that has been read from the persistent location (or that is about to be written to the persistent location). Storage system cache is implemented as high speed memory, the cost of which is much greater than the cost per GB of storage in a persistent tier. A key performance property of cache is that if a user reads data from the storage array, and that data was already in the storage system cache, then the read request can be satisfied by the storage system more efficiently and lower response time than if the storage system had to access the storage device (or devices) responsible for persisting the data. If the storage system makes the right choices about what data to place in cache, the performance of user read requests can be improved greatly. Storage system cache can be used to optimize the performance of tiered or non-tiered storage.

Aspects of the invention described above may be used in combination with a technique to evaluate which device's data, or portion(s) thereof, should reside on physical storage of different tiers based on performance goals. For example, an embodiment may use the techniques described herein in combination with the techniques described in U.S. patent application Ser. No. 12/803,571, filed on Jun. 30, 2010, TECHNIQUES FOR AUTOMATED EVALUATION AND MOVEMENT OF DATA BETWEEN STORAGE TIERS, which is incorporated by reference; and in combination with techniques described in U.S. patent application Ser. No. 12/798,097, filed Mar. 30, 2010, ANALYSIS TOOL FOR A MULTI-TIER STORAGE ENVIRONMENT, which is incorporated by reference herein.

While the invention is described through the above exemplary embodiments, it will be understood by those of ordinary skill in the art that modification to and variation of the illustrated embodiments may be made without departing from the inventive concepts herein disclosed. Moreover, while the embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. Apparatus comprising:
    a storage array having data movement logic including a virtual machine and an interface for exporting statistical information related to data storage, the data movement logic adapted to organize data in accordance with a data management processing plan; and
    a device separate from the storage array including an analysis function and a compiler, the analysis function operating in response to the statistical information from the storage array to generate a modification to the data management processing plan which is translated to byte code by the compiler;
    wherein the byte code is sent to the storage array by the device, and wherein the byte code executes on the virtual machine.

2. The apparatus of claim 1 wherein the data management processing plan is associated with movement of data between tiers in tiered storage.

3. The apparatus of claim 1 wherein the data management processing plan is associated with movement of data across storage system boundaries.

4. The apparatus of claim 3 wherein the data management processing plan is associated with balancing workload on a set of storage systems.

5. The apparatus of claim 3 wherein the data management processing plan is associated with maintaining network proximity to particular users of the data.

6. The apparatus of claim 1 wherein the statistical information includes extent level activity metrics.

7. The apparatus of claim 1 wherein the analysis function includes an application which functions in response to the statistical information to create storage optimization program text that describes data management operations that will allow the storage system to improve performance aspects of quality of service.

8. The apparatus of claim 7 wherein the performance aspects of quality of service include response time and I/O operation throughput.

9. The apparatus of claim 7 wherein the storage optimization program text is provided to a storage optimization programming language compiler which generates corresponding byte code which is sent to the virtual machine.

10. The apparatus of claim 9 wherein the storage array verifies the byte code.

11. The apparatus of claim 1 wherein the storage array implements updated storage optimization program byte code continuously, periodically or in response to a trigger condition.

12. The apparatus of claim 1 wherein the device operates in response to statistical information from a plurality of storage arrays to generate a data management processing plans for those storage arrays which are translated to byte code.

13. A computer program stored on non-transitory computer-readable memory and used to implement a method comprising:
    an interface for exporting statistical information related to data storage;
    an analysis function operating in response to the statistical information to generate a modification to a data management processing plan;
    a compiler which translates the data management processing plan modification into byte code; and
    a virtual machine upon which the byte code executes to provide data movement logic which causes data to be moved from a first storage resource to a second storage resource in accordance with the modification.

14. The computer program of claim 13 including associating the data management processing plan with movement of data between tiers in tiered storage.

15. The computer program of claim 13 including associating the data management processing plan with movement of data across storage system boundaries.

16. The computer program of claim 15 including associating the data management processing plan with balancing workload on a set of storage systems.

17. The computer program of claim 15 including associating the data management processing plan with maintaining network proximity to particular users of the data.

18. The computer program of claim 13 including providing extent level activity metrics in the statistical information.

19. The computer program of claim 13 wherein the analysis function includes an application functioning in response to the statistical information to create storage optimization program text that describes data management operations that will allow the storage system to improve performance aspects of quality of service.

20. The computer program of claim 19 wherein the performance aspects of quality of service include response time and I/O operation throughput.

21. The computer program of claim 19 including providing the storage optimization program text to a storage optimization programming language compiler which generates corresponding byte code which is sent to the virtual machine.

22. The computer program of claim 21 wherein the storage array verifies the byte code.

23. The computer program of claim 13 wherein the storage array implements updated storage optimization program byte code continuously, periodically or in response to a trigger condition.

24. The computer program of claim 13 wherein the device operates in response to statistical information from a plurality of storage arrays to generate a data management processing plans for those storage arrays which are translated to byte code.

25. A method comprising:
exporting, from a storage array, statistical information related to data storage;
generating a modification to a data management processing plan outside the storage array in response to the statistical information;
translating the modification to the data management processing plan into byte code; and
executing the byte code on a virtual machine of the storage controller to cause data to be moved from a first storage resource to a second storage resource in accordance with the modification.

26. The method of claim 25 including associating the data management processing plan with movement of data between tiers in tiered storage.

27. The method of claim 25 including associating the data management processing plan with movement of data across storage system boundaries.

28. The method of claim 27 including associating the data management processing plan with balancing workload on a set of storage systems.

29. The method of claim 27 including associating the data management processing plan with maintaining network proximity to particular users of the data.

30. The method of claim 25 including providing extent level activity metrics in the statistical information.

31. The method of claim 25 including creating storage optimization program text that describes data management operations that will allow the storage system to improve performance aspects of quality of service.

32. The method of claim 31 wherein the performance aspects of quality of service include response time and I/O operation throughput.

33. The method of claim 31 including providing the storage optimization program text to a storage optimization programming language compiler which generates corresponding byte code which is sent to the virtual machine.

34. The method of claim 33 including verifying the byte code.

35. The method of claim 25 including implementing updated storage optimization program byte code continuously, periodically or in response to a trigger condition.

36. The method of claim 25 including the device operating in response to statistical information from a plurality of storage arrays to generate a data management processing plans for those storage arrays which are translated to byte code.

* * * * *